(12) United States Patent
Goswami et al.

(10) Patent No.: US 8,332,068 B2
(45) Date of Patent: Dec. 11, 2012

(54) INTELLIGENT STEPPING FOR HUMANOID FALL DIRECTION CHANGE

(75) Inventors: Ambarish Goswami, Fremont, CA (US); Seung-kook Yun, Cambridge, MA (US); Yoshiaki Sakagami, Cupertino, CA (US)

(73) Assignee: Honda Motor Co., Ltd., Tokyo (JP)

( * ) Notice: Subject to any disclaimer, the term of this patent is extended or adjusted under 35 U.S.C. 154(b) by 503 days.

(21) Appl. No.: 12/610,865

(22) Filed: Nov. 2, 2009

(65) Prior Publication Data
US 2010/0161120 A1    Jun. 24, 2010

Related U.S. Application Data

(60) Provisional application No. 61/139,442, filed on Dec. 19, 2008.

(51) Int. Cl.
*G06F 19/00* (2011.01)
(52) U.S. Cl. ............................................. 700/245; 901/1
(58) Field of Classification Search .................. 700/245, 700/247, 249, 250, 258, 264; 318/568.12, 318/568.22, 580, 443; 901/1, 9, 46–48
See application file for complete search history.

(56) References Cited

U.S. PATENT DOCUMENTS

| | | | |
|---|---|---|---|
| 4,834,200 A | 5/1989 | Kajita | |
| 5,221,883 A | 6/1993 | Takenaka et al. | |
| 6,064,167 A | 5/2000 | Takenaka et al. | |
| 6,902,015 B2 | 6/2005 | Furuta et al. | |
| 6,915,230 B2 | 7/2005 | Kawai et al. | |
| 6,969,965 B2 | 11/2005 | Takenaka et al. | |
| 7,053,579 B2 | 5/2006 | Moridaira | |
| 7,120,518 B2 | 10/2006 | Takenaka et al. | |
| 7,127,326 B2 | 10/2006 | Lewis | |

(Continued)

FOREIGN PATENT DOCUMENTS
WO    WO 2005/098733    10/2005

OTHER PUBLICATIONS

Abdallah, M., et al., "A Biomechanically Motivated Two-Phase Strategy for Biped Upright Balance Control," Proceedings of the 2005 IEEE, International Conference on Robotics and Automation, Barcelona, Spain, Apr. 2005, pp. 2008-2013.

(Continued)

*Primary Examiner* — Dalena Tran
(74) *Attorney, Agent, or Firm* — Fenwick & West LLP; Mark Duell

(57) ABSTRACT

A system and method is disclosed for controlling a robot having at least two legs that is falling down from an upright posture. An allowable stepping zone where the robot is able to step while falling is determined. The allowable stepping zone may be determined based on leg Jacobians of the robot and maximum joint velocities of the robot. A stepping location within the allowable stepping zone for avoiding an object is determined. The determined stepping location maximizes an avoidance angle comprising an angle formed by the object to be avoided, a center of pressure of the robot upon stepping to the stepping location, and a reference point of the robot upon stepping to the stepping location. The reference point, which may be a capture point of the robot, indicates the direction of fall of the robot. The robot is controlled to take a step toward the stepping location.

18 Claims, 11 Drawing Sheets

U.S. PATENT DOCUMENTS

| | | | |
|---|---|---|---|
| 7,313,463 B2 * | 12/2007 | Herr et al. | 700/245 |
| 7,496,428 B2 | 2/2009 | Takenaka et al. | |
| 7,657,345 B2 * | 2/2010 | Endo et al. | 700/249 |
| 7,835,822 B2 | 11/2010 | Goswami et al. | |
| 2005/0055131 A1 | 3/2005 | Mikami et al. | |
| 2005/0113973 A1 | 5/2005 | Endo et al. | |
| 2005/0234593 A1 | 10/2005 | Goswami et al. | |
| 2006/0243499 A1 | 11/2006 | Hosada | |
| 2007/0016329 A1 | 1/2007 | Herr et al. | |
| 2008/0133053 A1 | 6/2008 | Pratt et al. | |
| 2008/0249662 A1 | 10/2008 | Nakamura | |

OTHER PUBLICATIONS

Bullo, F., "Exponential Stabilization of Relative Equilibria for Mechanical Systems with Symmetries," Symposium on Mathematical Theory of Network and Systems, Jul. 1998, 4 pages.

Fujiwara, K. et al., "An Optimal Planning of Falling Motions of a Humanoid Robot," Proceedings of the 2007 IEE/RSJ International Conference on Intelligent Robots and Systems, Oct. 29-Nov. 2, 2007, pp. 456-462, San Diego, California, United States.

Fujiwara, K. et al., "UKEMI: Falling Motion Control to Minimize Damage to Biped Humanoid Robot," Proceedings of the 2002 IEEE/RSJ International Conference on Intelligent Robots and Systems, EPFL, Oct. 2002, pp. 2521-2526, Lausanne, Switzerland.

Kajita, S. et al., "Resolved Momentum Control: Humanoid Motion Planning based on the Linear and Angular Momentum," Proceedings of the 2003 IEEE/RSJ, International Conference on Intelligent Robots and Systems, Oct. 2003, pp. 1644-1650.

Kajita, S. et al., "Study of Dynamic Biped Locomotion on Rugged Terrain," Proceedings of the 1991 IEEE International Conference on Robotics and Automation, Apr. 1991, pp. 1405-1411.

Kajita, S. et al., "The 3D Linear Inverted Pendulum Mode: A simple modeling for a biped walking pattern generation," Proceedings of the 2001 IEEE/RSJ, International Conference on Intelligent Robots and Systems, Oct. 29-Nov. 3, 2001, pp. 239-246.

Komura, T. et al., "A Feedback Controller for Biped Humanoids that Can Counteract Large Perturbations During Gait," Proceedings of the 2005 IEEE International Conference on Robotics and Automation, Apr. 2005, pp. 1989-1995.

Komura, T. et al., "Animating Reactive Motions for Biped Locomotion," VRST 04, Nov. 10-12, 2004, 9 pages.

Komura, T. et al., "Simulating Pathological Gait Using the Enhanced Linear Inverted Pendulum Model," IEEE Transaction on Biomedical Engineering, Sep. 2005, pp. 1502-1513, vol. 52, No. 9.

Lee, S. et al., "Reaction Mass Pendulum (RMP): An Explicit Model for Centroidal Angular Momentum of Humanoid Robots," 2007 IEEE International Conference on Robotics and Automation, Apr. 10-14, 2007, pp. 4667-4672, Rome, Italy.

Mayer, N. et al., "Balanced Walking and Rapid Movements in a Biped Robot by Using a Symmetric Rotor and a Brake," 2006, 6 pages. date is not available.

Park, J. H. et al., "Biped Robot Walking Using Gravity-Compensated Inverted Pendulum Mode and Computed Torque Control," Proceedings of the 1998 IEEE International Conference on Robotics & Automation, May 1998, pp. 3528-3533.

PCT International Search Report and Written Opinion, PCT Application No. PCT/US2009/067932, Feb. 4, 2010, 6 pages.

PCT International Search Report and Written Opinion, PCT Application No. PCT/US2009/068315, Feb. 5, 2010, 6 pages.

PCT International Search Report and Written Opinion, PCT Application No. PCT/US2009/067933, Mar. 2, 2010, 7 pages.

PCT International Search Report and Written Opinion, PCT Application No. PCT/US2007/085795, Jun. 19, 2008, 6 pages.

PCT International Search Report and Written Opinion, PCT Application No. PCT/US2008/083935, Jan. 28, 2009, 6 Pages.

Pratt, J. et al., "Capture Point: A Step Toward Humanoid Push Recovery," Humanoids 2006, Dec. 2-4, 2006, 8 pages, Genoa, Italy.

Pratt, J. et al., "Velocity-Based Stability Margins for Fast Bipedal Walking," Fast Motions in Biomechanics and Robotics, 2006, Chapter 21, pp. 1-27, Springer Berlin, Heidelberg, Germany.

Rebula, J. et al., "Learning Capture Points for Humanoid Push Recovery," Proceedings of the 2007 IEEE-RAS International Conference on Humanoid Robots, Nov. 29-Dec. 1, 2006, 8 pages, Pittsburgh, Pennsylvania, USA.

Renner, R. et al., "Instability Detection and Fall Avoidance for a Humanoid Using Attitude Sensors and Reflexes," Proceedings of the 2006 IEEE/RSJ International Conference on Intelligent Robots and Systems, Oct. 9-15, 2006, pp. 2967-2973, Beijing, China.

Yamakita, M., et al., "Virtual Coupling Control for Dynamic Bipedal Walking," IEEE International Conference on Intelligent Robots and Systems, 2001, p. 233-238, vol. 1.

Yun, S. et al., "Safe Fall: Humanoid Robot Fall Direction Change Through Intelligent Stepping and Inertia Shaping," ICRA 2009, 7 pages, Kobe, Japan.

* cited by examiner

INTELLIGENT STEPPING FOR HUMANOID FALL DIRECTION CHANGE

CROSS-REFERENCE TO RELATED APPLICATION

This application claims the benefit of U.S. Provisional Application No. 61/139,442, filed Dec. 19, 2008, which is incorporated by reference in its entirety.

This application is related to co-pending U.S. application Ser. No. 12/610,872, filed on Nov. 2, 2009, entitled "Inertia Shaping For Humanoid Fall Direction Change," by Ambarish Goswami et al., which is incorporated herein in its entirety by reference. This application is also related to co-pending U.S. application Ser. No. 11/946,702, filed Nov. 28, 2007, entitled "Determination of Foot Placement for Humanoid Push Recovery," which is incorporated herein in its entirety by reference.

BACKGROUND OF THE INVENTION

1. Field of the Invention

The present invention relates to controlling the motion of a robot.

2. Description of Background Art

Safety is a primary concern that should be addressed before humanoid robots can freely exist in human surroundings. Out of a number of possible situations where safety becomes an issue, one that involves a fall is particularly worrisome. A humanoid robot falling from an upright (e.g., standing or walking) posture can cause damage to delicate and expensive objects in the surroundings or injury to a nearby human being.

A humanoid robot fall may be caused due to unexpected or excessive external forces, unusual or unknown slipperiness, or the slope or profile of the ground. The fall may involve the robot slipping, tripping, or toppling. When the disturbances that threaten balance are larger than what the robot's balance controller can handle, the robot falls. Regardless of the substantial progress in humanoid robot balance control strategies, the possibility of a fall, however remote, remains real, even unavoidable. What is needed are techniques for reducing the damage to objects in the surroundings of a humanoid robot when the robot falls.

SUMMARY OF THE INVENTION

Embodiments of the invention provide techniques for controlling a robot having at least two legs that is falling down from an upright posture. An allowable stepping zone where the robot is able to step while falling is determined. The allowable stepping zone may be determined based on leg Jacobians of the robot and maximum joint velocities of the robot. A stepping location within the allowable stepping zone for avoiding an object is determined. The determined stepping location maximizes an avoidance angle comprising an angle formed by the object to be avoided, a center of pressure of the robot upon stepping to the stepping location, and a reference point of the robot upon stepping to the stepping location. The reference point, which may be a capture point of the robot, indicates the direction of fall of the robot. The robot is controlled to take a step toward the stepping location.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION OF THE EMBODIMENTS

Figure 1A:
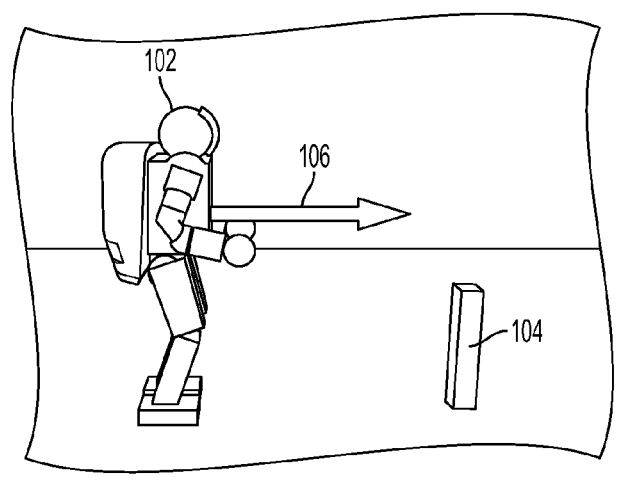
FIG. 1A illustrates a frontward push applied to an upright standing humanoid robot, in one embodiment.

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Figure 1B:
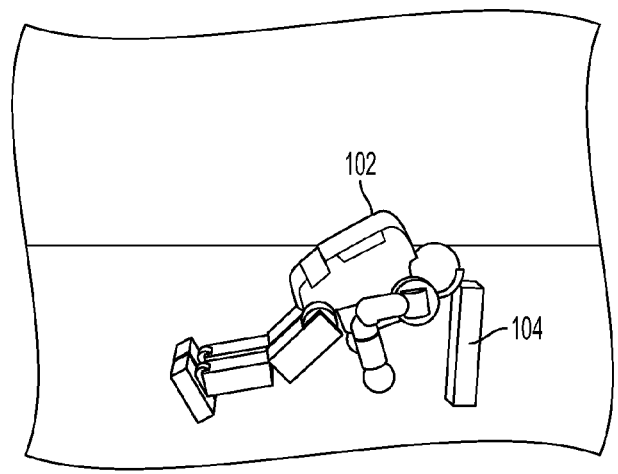
FIG. 1B illustrates the robot of FIG. 1A falling toward an object, in one embodiment.

FIG. 1A illustrates a frontward push 106 applied to an upright standing humanoid robot 102, in one embodiment. An object 104 is positioned in front of the robot 102. The object 104, can be inanimate (e.g., a block) or a living entity (e.g., a cat or a human child). Without any fall controller, the robot falls forward and hits the object 104, as illustrated in FIG. 1B. This may cause damage to both the robot and the object.

Figure 1C:
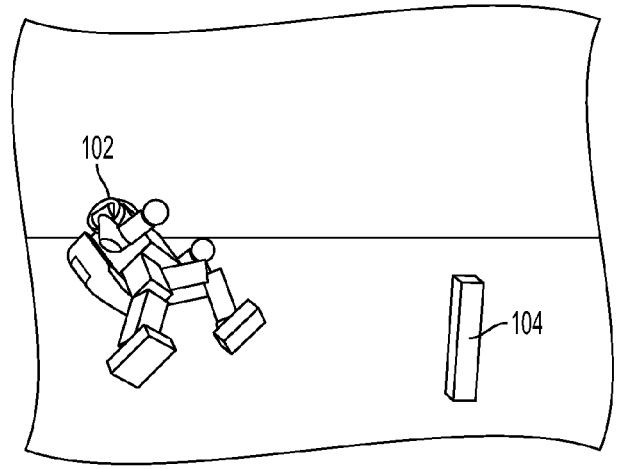
FIG. 1C illustrates the robot of FIG. 1A falling away from the object using a fall controller, in one embodiment.

In one embodiment, the robot 102 has a fall controller that enables the robot to fall with reduced damage to nearby objects or people. In certain situations, the fall controller can cause the robot to change its direction of fall by taking a step. FIG. 1C illustrates a fall of a robot 102 with a fall controller, in one embodiment. In FIG. 1C, the robot in FIG. 1A has taken a step to change its direction of fall, and has avoided hitting the object 104 as a result.

In one embodiment, a balance controller (e.g., a push-recovery controller) attempts to maintain or regain balance and avoid a fall. If the balance controller has failed to stabilize the robot, the fall controller is activated to control the direction of fall. The fall controller, further described below, takes over after the balance controller has failed. A fall detector may detect that the balance controller has failed and may activate the fall controller.

Figure 2:
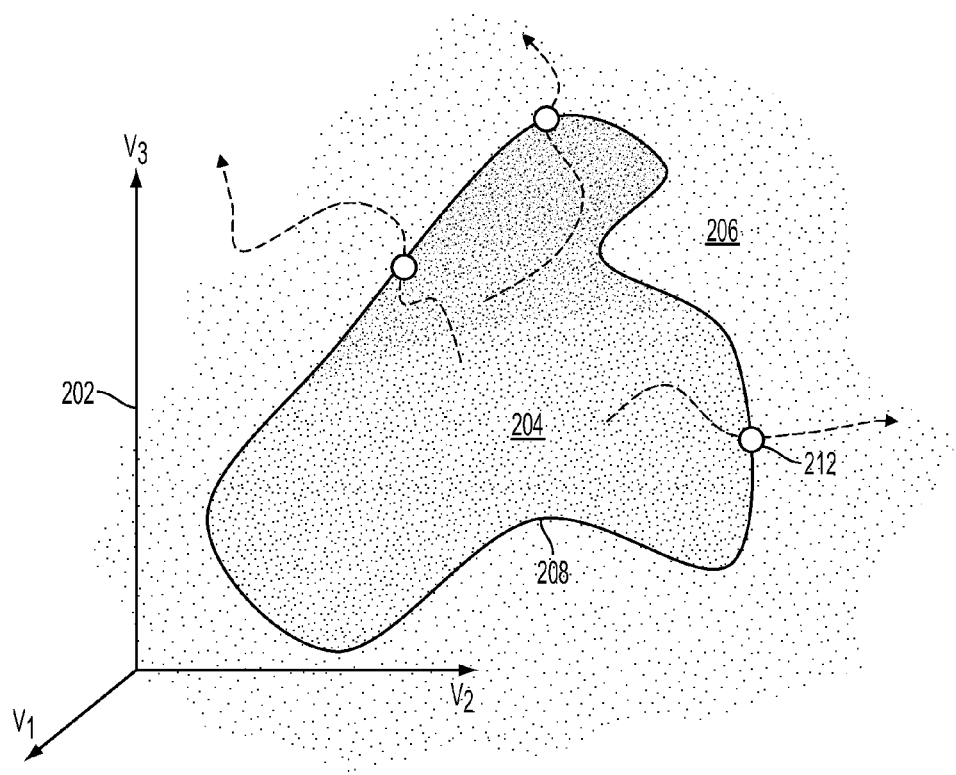
FIG. 2 illustrates a Fall Trigger Boundary (FTB) enclosing a region in a robot's feature space in which a balance controller is able to stabilize the robot, in one embodiment.

FIG. 2 illustrates a Fall Trigger Boundary (FTB) enclosing a region in a robot's feature space in which the balance controller is able to stabilize the robot, in one embodiment. The robot's feature space describes the state of the robot. A three-dimensional feature space is shown in FIG. 2, but generally the feature space can have any number of dimensions. The axes 202 of FIG. 2 represent different robot variables such as Center of Mass (CoM) coordinates, Center of Pressure (CoP) coordinates, robot lean angle, or angular momentum components. Some of these variables are directly measured by sensors and some others can be computed from the sensor data along with a set of known robot 102 parameters, which are constants.

The balance control region 204 represents a portion of the feature space in which the balance controller is able to stabilize the robot. The fall region 206 represents the rest of the feature space in which the balance controller is not able to stabilize the robot and in which a fall is certain. These two regions are separated by the FTB 208. The shape and size of the FTB depends on the nature of the balance controller. An exit 212 through the FTB 208 is an indication of a certain fall and this event is used to activate a switch from the robot's balance controller to a fall controller.

Figure 3A:
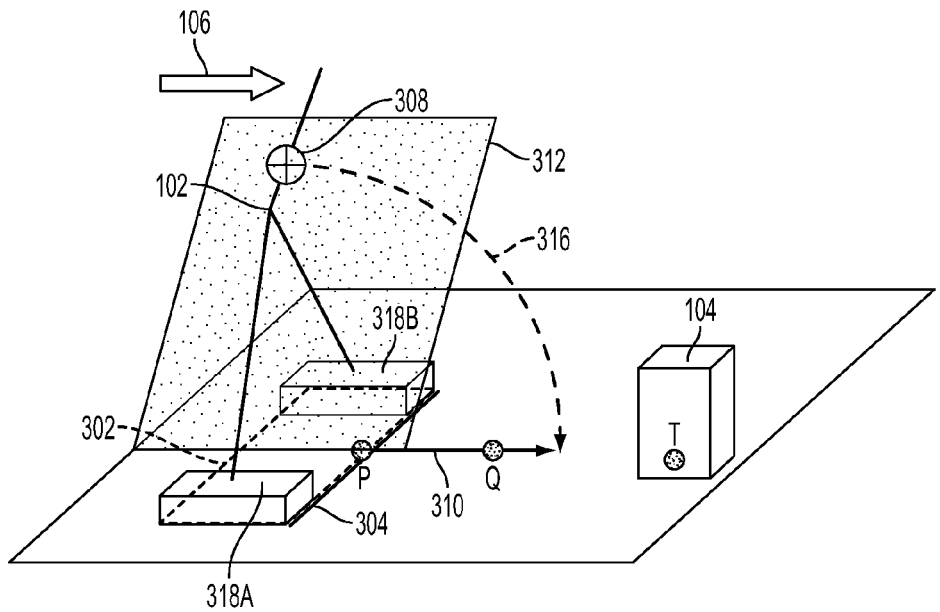
FIG. 3A illustrates a humanoid robot stick diagram subjected to a forward push, in one embodiment.

FIG. 3A illustrates a humanoid robot 102 subjected to a forward push 106, in one embodiment. The robot 102 has a CoM 308, which is computed continuously, and two feet 318. The support base 302 (illustrated as a dotted polygon) is the convex hull of the contact points between the robot feet 318 and the ground. In one embodiment, the support base 302 is determined by finding the convex hull containing the vertices of the feet 318 of the robot using various known algorithms for efficiently finding the convex hull containing a set of points. In FIG. 3A, the feet of the robot are parallel to each other, but this is not necessarily the case. The support base is not necessarily a parallelogram.

If the push 106 is strong enough to topple the robot 102, the CoP will approach and touch an edge (or corner) of the support base 302. As mentioned above, a push is not the only reason for a fall. The CoP will also approach and touch an edge (or corner) of the support base if the robot falls due to slipping or tipping. The CoP is the location of the resultant force on the feet from the ground and is always located within or on the perimeter of the support base. The direction of fall of a humanoid robot is determined based on the CoP location with respect to the support base 302. In FIG. 3A, the point P is the CoP of the robot as it begins to topple in the direction of the push 106. Although the robot will fall in the general direction of a push, the precise direction of fall is not necessarily coincident with the push direction. In addition to the direction and magnitude of the push force, the fall direction may depend on the robot configuration, its kinematic and dynamic states, and in particular its contact condition with the floor. As it begins falling, the robot 102 rotates about edge 304, referred to as the tipping edge or leading edge. If the CoP is touching a corner, the robot may instead rotate about a leading corner. The robot begins falling in a direction 310 perpendicular to the tipping edge 304. The path of the CoM 308 of the robot as it falls is shown by dotted line 316 and is contained in plane 312. If no action is taken, the robot will fall on object 104.

In FIG. 3A, the direction and magnitude of the toppling motion is given by PQ, where Q is a reference point. In one embodiment, the reference point Q is a capture point of the robot. Capture points are further described below. Although PQ may not be initially perpendicular to the tipping edge 304 of the support base 302, it becomes so once the toppling motion begins (i.e., as the robot begins toppling about the tipping edge).

Figure 3B:
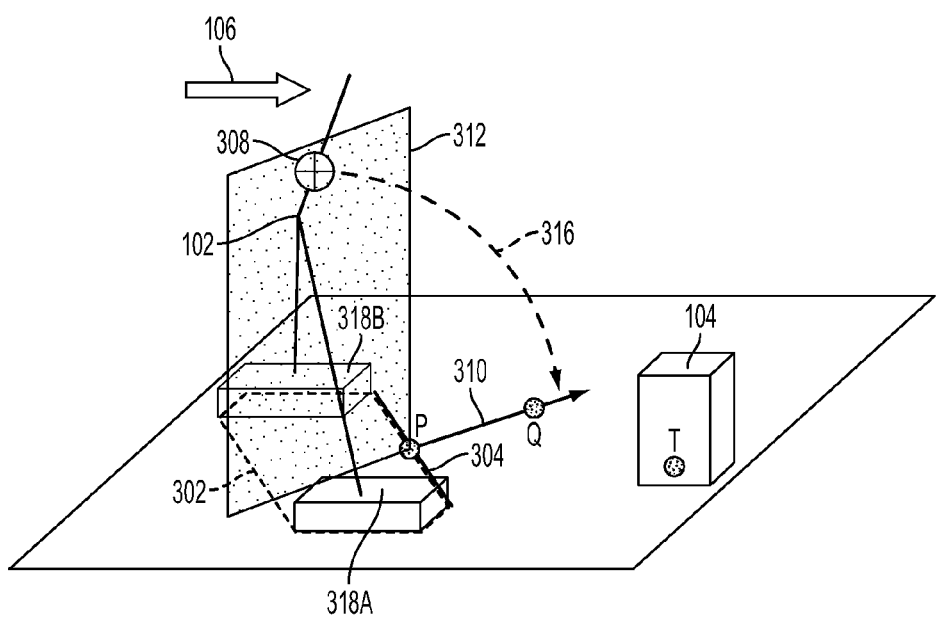
FIG. 3B illustrates a humanoid robot stick diagram subjected to the same push as in FIG. 3A but with a different support base, in one embodiment.

A change in the physical location of the tipping edge of the support base with respect to the robot CoM exerts significant influence on the direction of robot rotation which, in turn, determines the direction of fall. The tipping edge of the support base can be modified by having the robot either lift a foot off the ground or take a step. FIG. 3B illustrates a humanoid robot 102 subjected to the same push 106 as in FIG. 3A but with a support base having a different geometry, and, in particular, a different tipping edge, in one embodiment. Consequently, the robot rotates and falls in the new direction PQ. By modifying the support base from FIG. 3A to FIG. 3B (e.g., by taking a step), it is possible to effect a change in the fall direction and avoid falling on the object 104.

Two issues potentially arise when attempting to change the direction of fall of a robot. First, the robot may become underactuated when it starts toppling. This creates an additional degree of freedom (DOF) if the robot is toppling about an edge. It creates three additional DOFs if the robot is toppling about a corner. Second, the CoP and the reference point continuously move as the robot moves.

Figure 4:
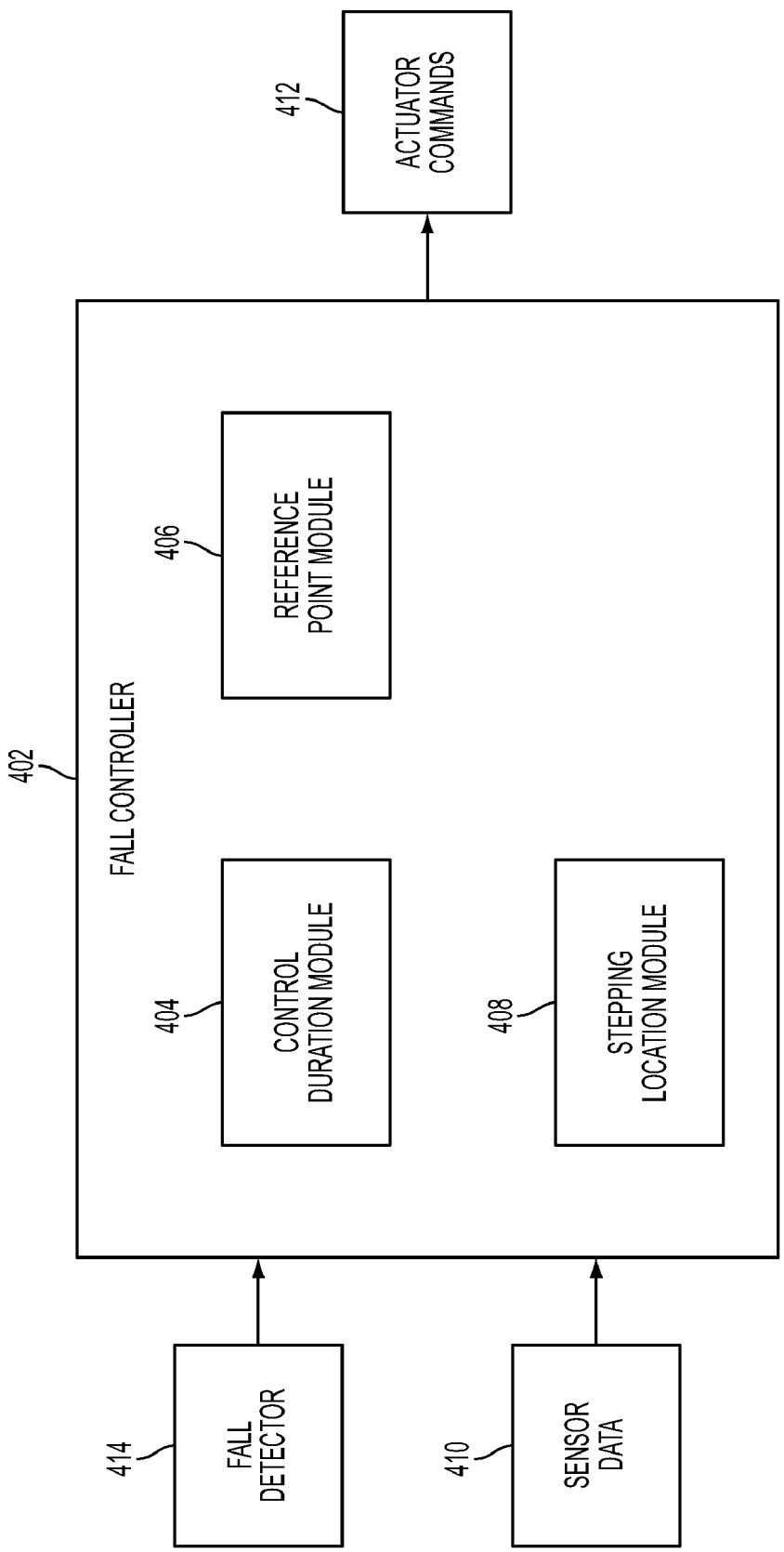
FIG. 4 is a block diagram illustrating a fall controller for controlling a robot during a fall, in one embodiment.

FIG. 4 is a block diagram illustrating a fall controller 402 for controlling a robot during a fall, in one embodiment. The fall controller enables the robot to change the direction of fall to avoid hitting nearby objects or people. The fall controller 402 includes a control duration module 404, a reference point module 406, and a stepping location module 408. These modules are discussed further below. The fall controller receives input from a fall detector 414 and from sensor data 410 generated from sensors attached to the robot. For example, the fall detector 414 may indicate to the fall controller 402 that the robot is no longer able to maintain balance and is about to fall. Upon receiving such an indication, the fall controller 402 can become active. Sensors can provide measurements such as joint angles and velocities. The fall controller issues actuator commands 412 to control the actuators in the robot. The actuators can cause the robot to take a step or make other movements.

Figure 5:
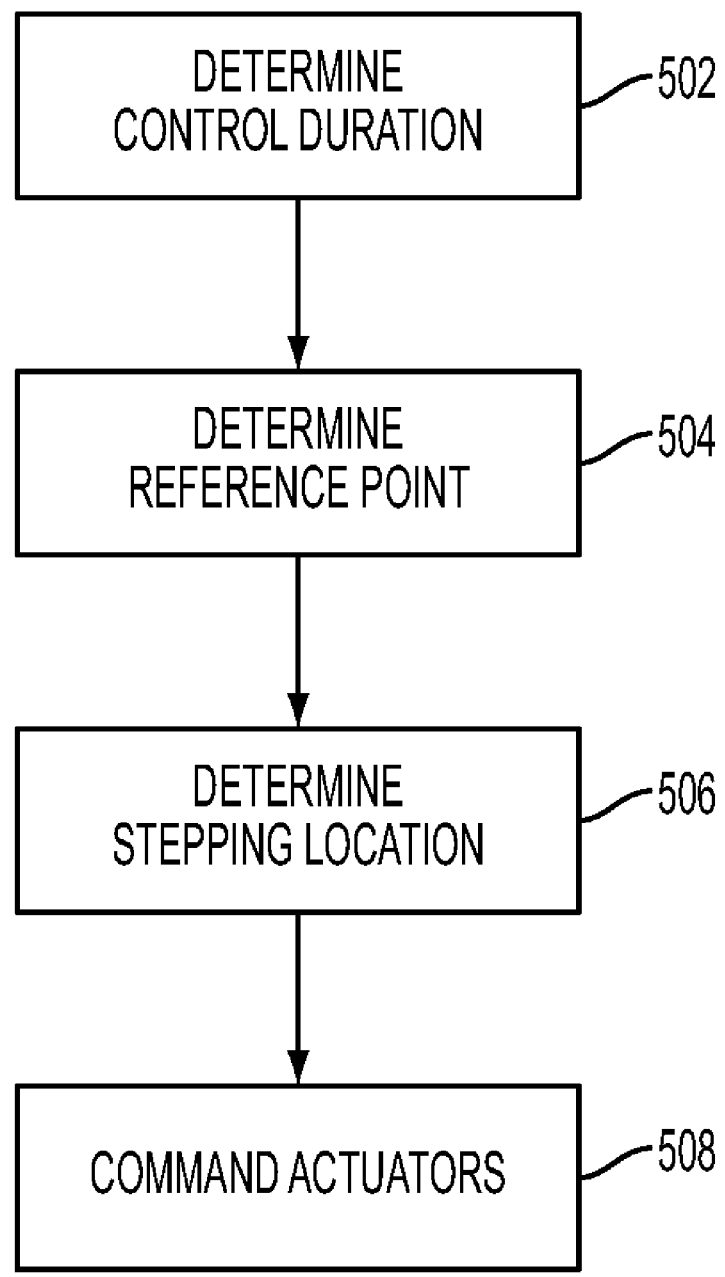
FIG. 5 is a flowchart illustrating a method for controlling a robot during a fall, in one embodiment.

FIG. 5 is a flowchart illustrating a method for controlling a robot during a fall, in one embodiment. Once the state of the humanoid robot exits the fall trigger boundary 208, the fall controller 402 estimates the direction and time-to-fall of the robot. Based on the estimation, it computes the best position to step and controls the leg accordingly. The control duration module 404 determines 502 a control duration. The control duration is the length of time after the push force has disappeared during which the fall controller 402 is assumed to be active. Ideally, the control duration should be significantly shorter than the estimated fall time of the robot. This is due to the fact that control commands after a certain time are unlikely to have any beneficial effect on the robot fall direction. The reference point module 406 determines 504 a location of a reference point at the end of the control duration. This estimation is based on a linear inverted pendulum model. The stepping location module 408 determines 506 an optimal stepping location on the ground. The fall controller 402 commands 508 the actuators in the robot to cause the robot's legs to step to the optimal stepping location. The steps illustrated in FIG. 5 are each described further below.

Figure 6:
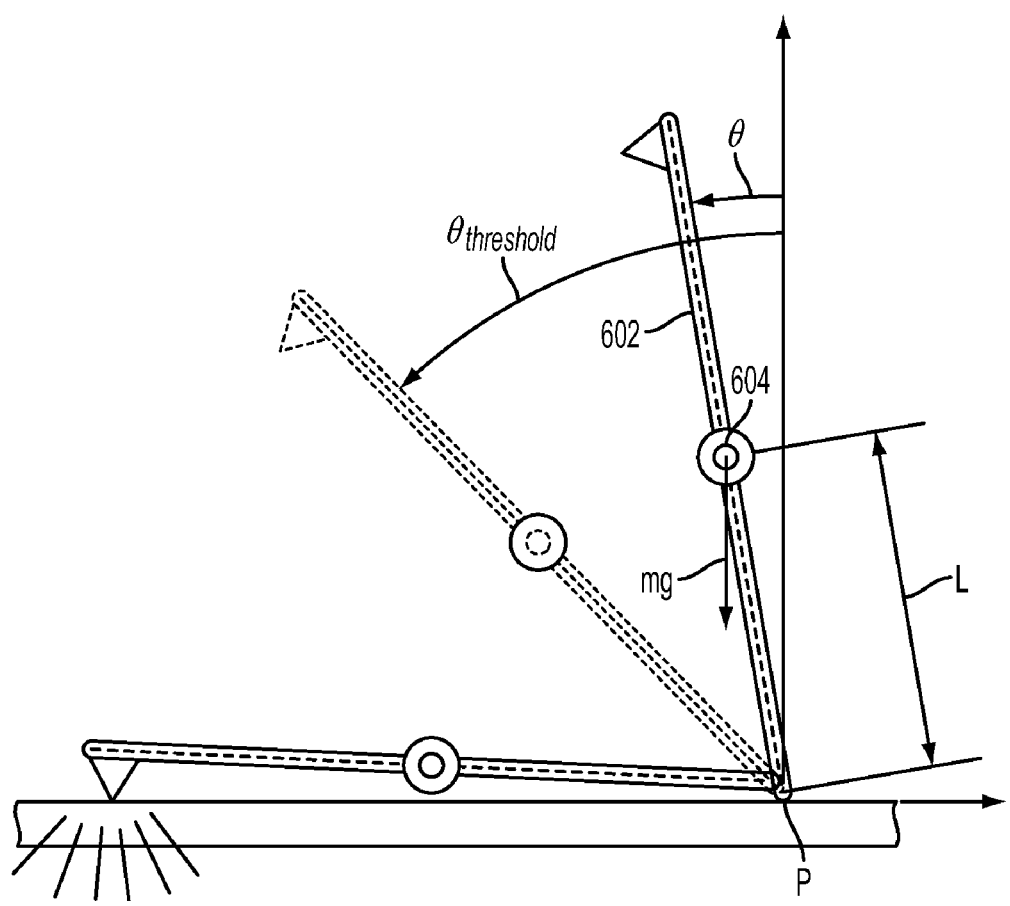
FIG. 6 illustrates an equivalent inverted pendulum falling to the ground, in one embodiment.

In one embodiment, the robot is approximated with an equivalent inverted pendulum. This approximation allows for faster calculations for predicting robot states. FIG. 6 illustrates an equivalent inverted pendulum 602 falling to the ground, in one embodiment. The foot of the robot approximately corresponds to point P and the head of the robot approximately corresponds to the triangle at the end of the pendulum. Point P is the contact point of the pendulum and is coincident with the CoP of the robot. The pendulum connects the CoP with the CoM 604, which is located a distance L from the CoP along the pendulum. The pendulum has a point mass m at the CoM 604 equal to the mass of the robot. A force equal to mg is exerted on the pendulum at the CoM 604 by gravity, where g is the local acceleration due to gravity. The angle between the CoP-CoM line, called the inclination line, and vertical (i.e., between the pendulum and vertical) is referred to as inclination angle $\theta$.

If the CoP is located on an edge of the support base, the robot is modeled as a two-dimensional (2D) inverted pendulum 602. If, instead, the CoP is located at a corner, the 2D model is not sufficient, and the robot may be modeled as a three-dimensional (3D) spherical pendulum. The 2D pendulum model has a closed-form solution. The 3D spherical pendulum module does not have a closed-form solution, but its dynamic equations can be simulated for the period of control duration. Because the control duration is typically short, this simulation can be adequately handled.

As mentioned above, the control duration module 404 determines 502 a control duration. An estimate of the control duration is useful, since the control duration is the maximum time for the robot to complete a step. Knowledge of the control duration allows for a determination of the possible stepping range for the robot during a fall. According to one study, a simple forward fall of an adult human starting from a stationary 15-degree inclination takes about 0.98 seconds, while a backward fall starting from a stationary 5-degree inclination takes 0.749 seconds for a flexed-knee fall and 0.873 seconds for an extended-knee fall.

The fall controller 402 remains active until the lean angle $\theta$ crosses a certain threshold $\theta_{threshold}$, shown in FIG. 6. The control duration is the remaining time until this threshold is crossed. It is assumed that all external forces have disappeared by the time the robot starts to use the fall controller. The control duration is obtained through an incomplete elliptic integral of the first kind of the 2D pendulum model when the lean angle goes over the threshold. For the spherical pendulum model, its dynamic equations are simulated.

The reference point module 406 determines 504 a location of a reference point at the end of the control duration. In one embodiment, a capture point is used as the reference point. A capture point is the point on the ground where a robot can step to in order to come to a stopped state (e.g., a complete stop) in a vertically upright configuration after an external disturbance (e.g., a push). Capture points are further described in co-pending U.S. application Ser. No. 11/946,702 mentioned above. The location of the capture point is proportional to the linear velocity of the CoM of the robot. The capture point ($x_Q$, $y_Q$) for a single point mass inverted pendulum approximation of the robot is computed as follows:

$$x_Q = x_G + \dot{x}_G \sqrt{\frac{z_G}{g}} \quad (1)$$

$$y_Q = y_G + \dot{y}_G \sqrt{\frac{z_G}{g}} \quad (2)$$

where ($x_G$, $y_G$, $z_G$) and ($\dot{x}_G$, $\dot{y}_G$, $\dot{z}_G$=0) are the robot CoM position and velocity, as estimated from the dynamic equations of the pendulum models. The capture point is the reference point used by the stepping location module 408 to determine an optimal stepping location.

Suppose the control duration determined by the control duration module 404 is $\Delta T$. In the 2D pendulum model, the velocity after $\Delta T$ is computed from the energy equation as follows:

$$\dot{\theta}(\Delta T) = \sqrt{\frac{2E}{I} - \frac{2\,mg\,L\cos(\theta(\Delta T))}{I}} \quad (3)$$

where E is the total energy (constant) of the pendulum, I is the moment of inertia with respect to the CoP, and L is the distance between the CoP and the CoM. For the spherical pendulum, this analytic expression does not apply. Simulation of the dynamic equations yields the velocity of the spherical pendulum.

Figure 7:
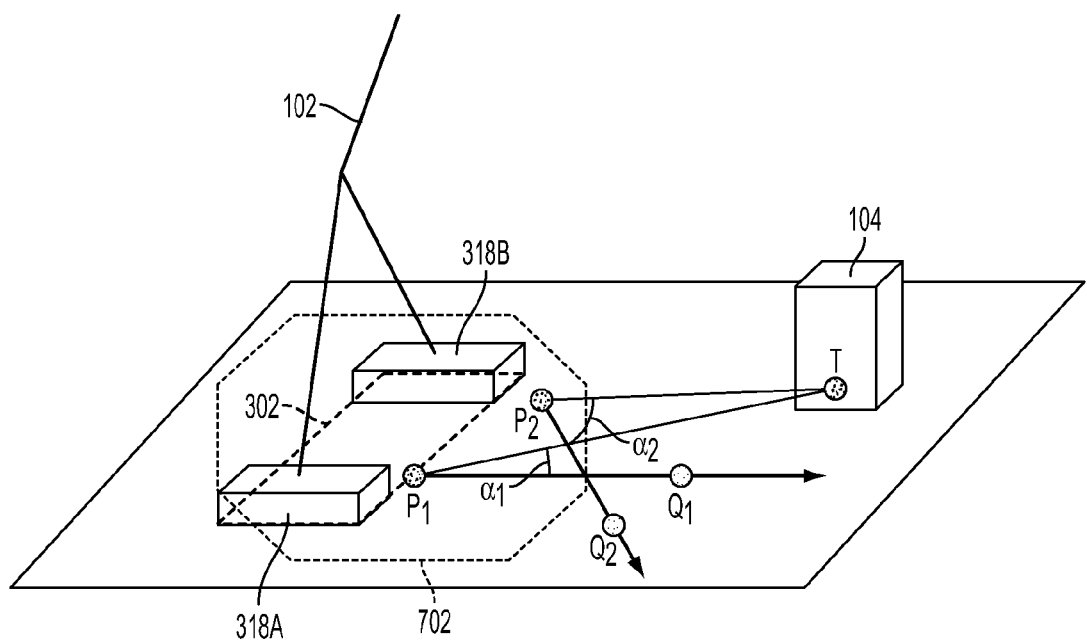
FIG. 7 illustrates a humanoid robot that is about to topple, in one embodiment.

The stepping location module 408 then determines 506 an optimal stepping location on the ground. This determination is explained in the context of FIG. 7. FIG. 7 illustrates a humanoid robot 102 that is about to topple, in one embodiment. The previous CoP $P_1$ has reached an edge of the support base 302, and the support base is shrinking to the line (i.e., the tipping edge of the support base). $Q_1$ is the reference point (e.g., capture point) corresponding to the current state of the robot. The allowable stepping zone 702 indicates the region to which the robot can take a step. The calculation of the allowable stepping zone 702 is described further below. Approximating the robot as a rigid body instantaneously, the horizontal projection of the CoM trajectory is parallel to $P_1Q_1$ in FIG. 7. T is a point (on the ground) within the target object 104 to avoid. It is desired to find a point $P_2$ within the allowable stepping zone 702 of the robot such that the robot is maximally diverted away from T. Such a point maximizes $\alpha_2$, where $\alpha_2$ is the angle formed by the points $Q_2P_2T$, where $Q_2$ is the reference point after stepping to $P_2$.

Figure 8:
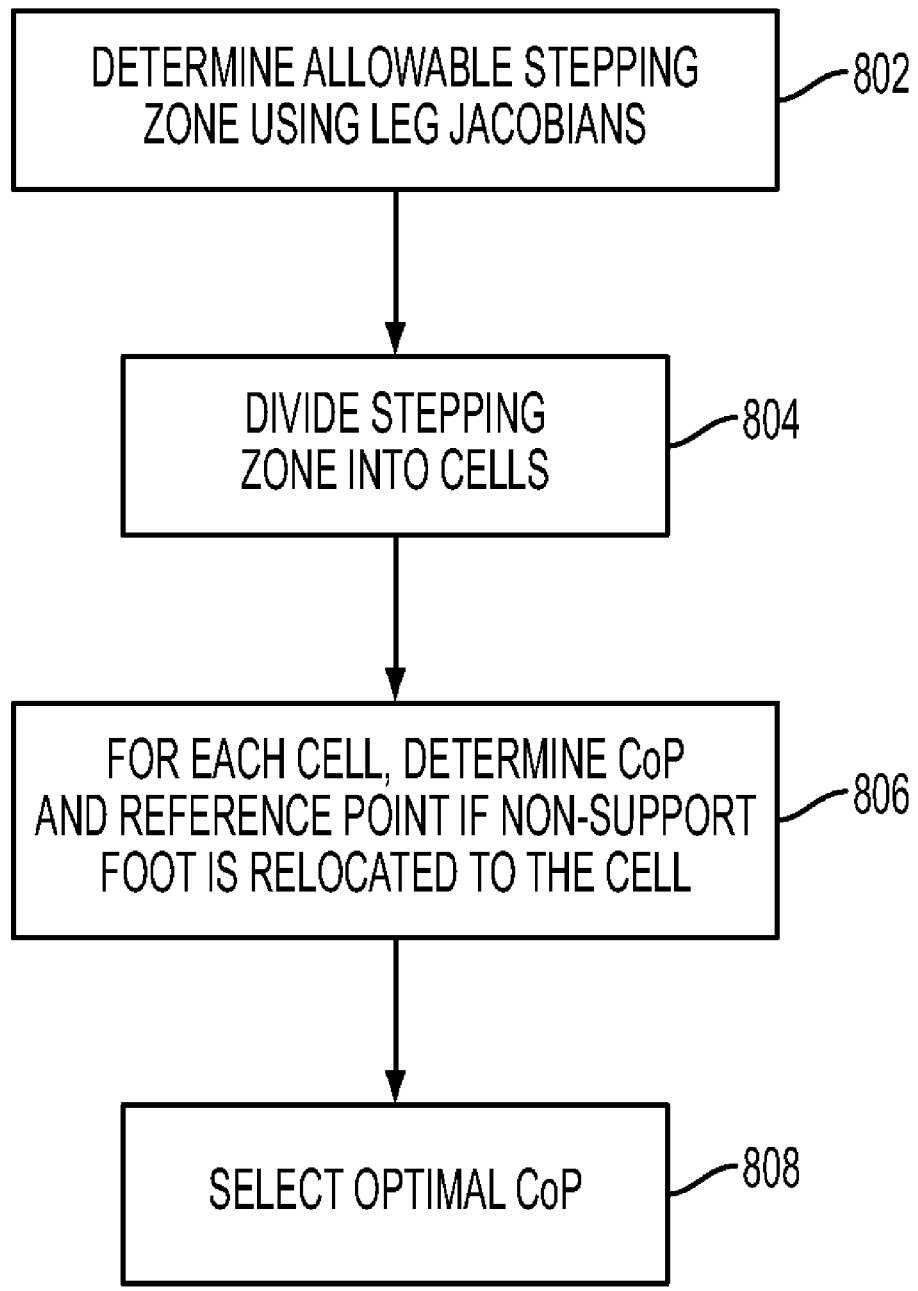
FIG. 8 is a flowchart illustrating a method for determining an optimal stepping location on the ground, in one embodiment.

FIG. 8 is a flowchart illustrating a method for determining 506 an optimal stepping location on the ground, in one embodiment. A stepping zone 702 is determined 802 using leg Jacobians, and the stepping zone is divided 804 into cells. For each cell, a new CoP and reference point are determined 806 under the assumption that the non-support foot of the robot steps to that cell. Based on the determined CoPs and reference points for each cell, an optimal CoP corresponding to a cell is selected 808. This cell is deemed the optimal stepping location. Each of these steps are discussed in further detail below.

As mentioned above, leg Jacobians are used to determine 802 the allowable stepping zone 702, in one embodiment. This determination is made given the control duration $\Delta T$ as calculated above. Suppose the robot has a firm support on the ground. With two legs, the following equations then hold:

$$\dot{P}_L - \dot{P}_{body} = J_L \dot{\theta}_L \quad (4)$$

$$\dot{P}_R - \dot{P}_{body} = J_R \dot{\theta}_R \quad (5)$$

where $P_L$ and $P_R$ are the positions of the left and right feet with respect to the support foot $P_L$, and where $P_{body}$ is the location of the body frame. $\theta_L$ and $\theta_R$ are 6×1 joint angle vectors of the robot legs, and $J_L$ and $J_R$ are the leg Jacobian matrices.

Subtracting Equation 4 from Equation 5:

$$\dot{P}_R - \dot{P}_L = [J_R - J_L][\dot{\theta}_R \dot{\theta}_L]^T \quad (6)$$

The (6×12) foot-to-foot Jacobian matrix J is given as:

$$\hat{J} = [J_R - J_L] \quad (7)$$

Figure 9:
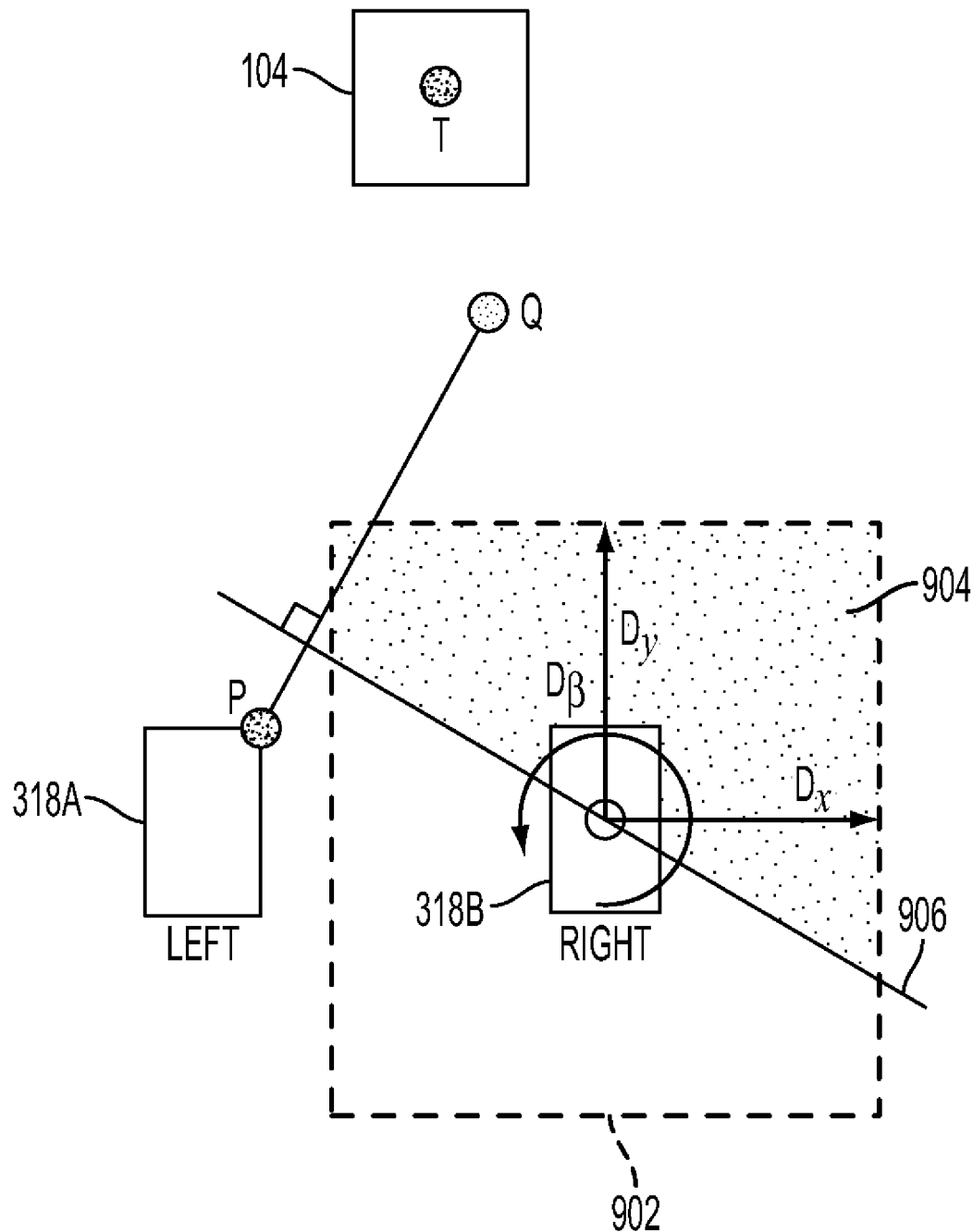
FIG. 9 illustrates an allowable stepping zone as estimated by the Jacobians, in one embodiment.

FIG. 9 illustrates an allowable stepping zone as estimated by the Jacobians, in one embodiment. The allowable stepping zone is the region on the floor where the robot's swing foot can reach during the control duration, $\Delta T$ secs. In analogy with fixed-based manipulator terminology, the allowable stepping zone is the time-limited reachable workspace of the robot's swing foot on the ground plane. An exact computation of this is complex, hence we make an approximate estimation of this region. Assuming that each leg joint has equal velocity limit, theta_max, the approximate region can be calculated as:

$$D_{k(x,y,\beta)} = \Delta T \sum_{i=1}^{12} |\hat{J}_{ki} \dot{\theta}_i^{MAX}| \approx \gamma \Delta T \sum_{i=1}^{12} |\hat{J}_{ki}| \quad (8)$$

where $\dot{\theta}_i^{MAX}$ is the maximum velocity of a leg joint. $\gamma$ is a constant included to approximate $\dot{\theta}_i^{MAX}$, which is assumed the same for all joints.

FIG. 9 shows the feet 318 of the robot, where the right foot 318B is the non-support foot, also referred to as the stepping or moving or swing foot. The allowable stepping zone on the floor where the robot's swing foot can reach within the control duration is denoted by D. Only the upper half of the region 902 cut by the separatrix line 906 is considered as a possible location for foot placement. This is the allowable stepping zone 904. The separatrix line 906 is perpendicular to PQ and goes through the center of the moving foot. Only this half of the region is considered for stepping since a robot falling along PQ would be unable to place its foot in the other half of the region. P is the CoP with the single support and Q is the reference point. The allowable stepping zone has edges $D_x$ and $D_y$. $D_\beta$ denotes the amount of rotation of the swing foot.

The allowable stepping zone 904 is then divided 804 into cells. For example, the allowable stepping zone 904 is divided into cells of x, y. Additionally, for each (x,y) location of the foot, a range of foot rotation angles $\beta$ are considered. The angle $\beta$ is described with respect to the normal to the stepping surface, and is therefore not related to foot tipping. The stepping zone 904 can be divided using a grid, where each cell in the grid has an x and y coordinate and an angular displacement $\beta$. These cells represent various divisions within the stepping area.

Computations are then performed for each cell to determine the optimal cell to step to (see step 806 above). The non-support foot, also referred to as the swing foot or the stepping foot, is re-located according to (x, y, $\beta$) of each cell, and estimates of a new reference point and CoP are determined. The avoidance angle α is computed for each case and the optimal CoP is selected 808 as follows:

$$P_2 = \arg\max_{P_2 \in CoP(D)} \text{angle}(Q_2 P_2 T) \tag{9}$$

The foot sole is assumed to be rectangular. The support polygon can be computed with a finite number of points. The reference point is estimated at the time the non-support foot touches the ground.

Assuming that the robot is in a double support phase, the optimal CoP is selected from among the following five cases: (1) No change, i.e., the robot does not react, (2) Lifting (and not replanting) the left foot 318B, (3) Lifting (and not replanting) the right foot 318A, (4) Taking a left step with foot 318B, and (5) Taking a right step with foot 318A. Cases (4) and (5) can be considered for each cell described above when selecting an optimal CoP.

Once the optimal step location is computed, the actuators at the joint angles are commanded 508 such that the robot takes a step as near as possible to the optimal step location. However, commanding the joint angles is not trivial because the inverse kinematics solution is not precise for a toppling robot. One consideration is that the support foot of the robot is not flat with the ground, i.e., it is underactuated, and therefore the robot may not step as expected. This can be compensated for if the foot rotation angle of the robot is known. In one embodiment, the robot possesses a gyro sensor in its trunk that is capable of measuring the trunk orientation angle. The robot is also able to determine the angle of the foot relative to the trunk of the robot by using various joint angle sensors (e.g., in the leg of the robot). The foot rotation angle (relative to the ground) can be determined based on the mismatch between the trunk orientation angle and the joint angles in the leg of the robot as determined by joint angle sensors.

Figure 10A:
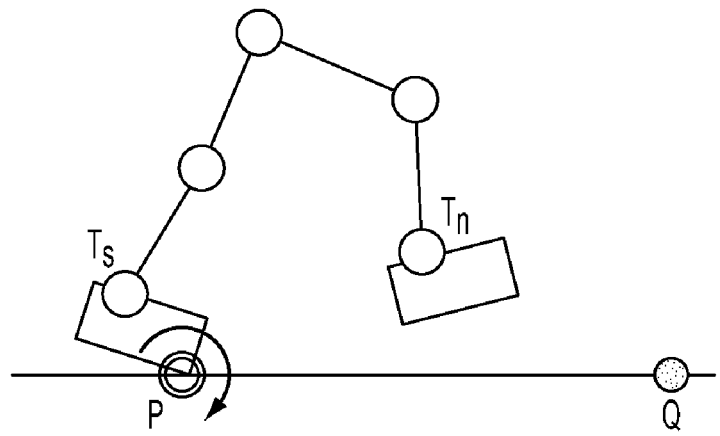
FIG. 10A illustrates the legs of a robot that is about to take a step, in one embodiment.
Figure 10B:
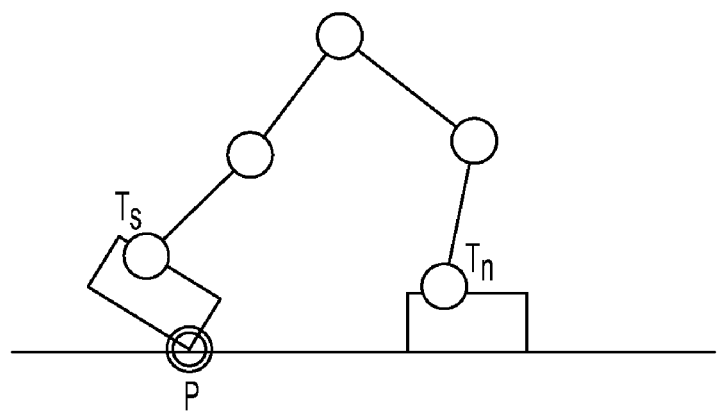
FIG. 10B illustrates the legs of the robot of FIG. 10A having taken a step with the stepping foot touching down nearly flat on the ground, in one embodiment.

Given the foot rotation angle, the leg controller attempts to cause the swing foot to be flat or nearly flat as it touches down on the ground. It is assumed that the CoP does not change during a fall, so the CoP can be modeled as passive rotational joint at which support foot rotates. FIG. 10A illustrates the legs of a robot that is about to take a step, and FIG. 10B illustrates the robot has taken a step with the stepping foot touching down nearly flat on the ground. The rotation of the support foot around the CoP (point P) is shown in FIG. 10A. As mentioned above, the passive joint is not actuated. However, the support foot is expected to rotate as estimated by the pendulum models without control. A transformation matrix from the support foot to the non-support foot $T_n^s$ is:

$$T_n^s = (T_s^0)^{-1} T_n^0 \tag{10}$$

where $T_n^0$ is the transformation of the non-support foot and is already fixed in optimizing the CoP.

If the joints are controlled according to $T_n^s$ before the non-support foot hits the ground as in FIG. 10A, the robot is expected to step to on the desired location by gravity (FIG. 10B). The pre-computed $T_s^0$ is for the landed posture (FIG. 10B). The joint velocities for moving the swing leg may then be computed according to:

$$\dot{\theta} = \hat{J}^\# (\dot{P}_R - \dot{P}_L) \tag{11}$$

where $\hat{J}^\#$ is the least damped-square pseudo-inverse of $\hat{J}$.

Figure 11:
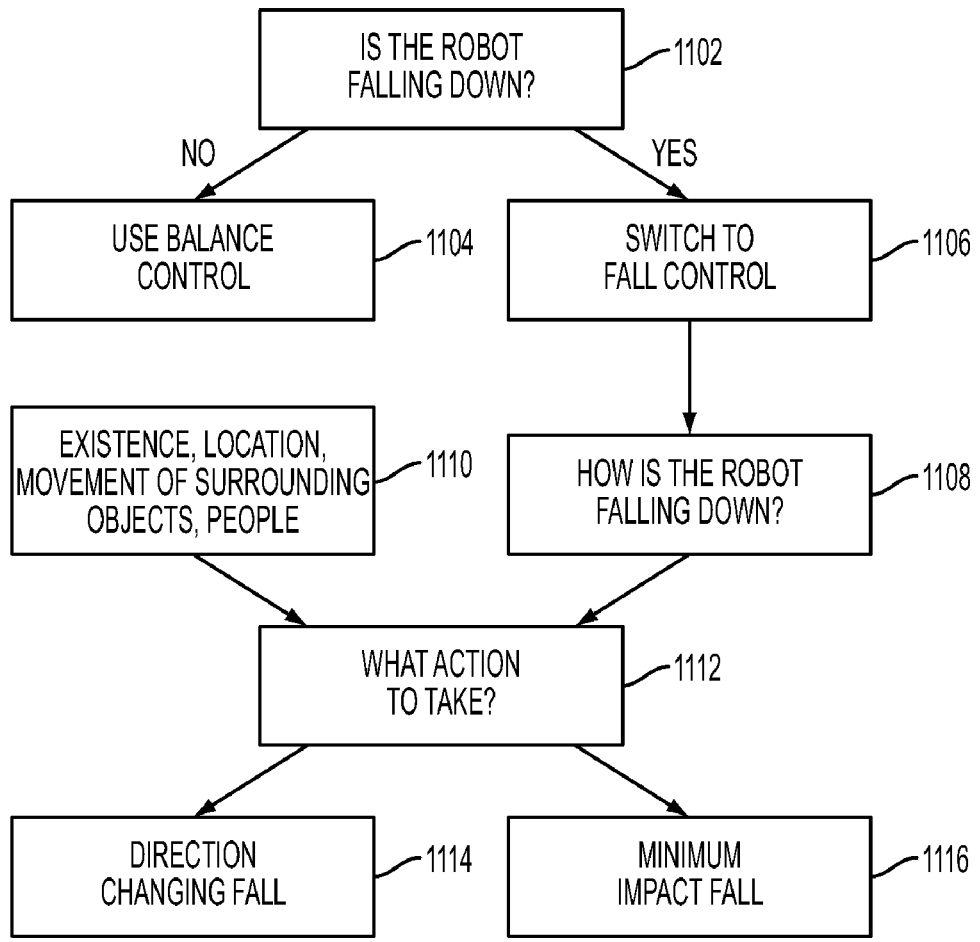
FIG. 11 is a flowchart illustrating a method for controlling a fall of a humanoid robot, in one embodiment.

FIG. 11 is a flowchart illustrating a method for controlling a fall of a humanoid robot, in one embodiment. In step 1102, it is determined if the robot is falling down. If the robot is not falling down, balance control is used in step 1104. If the robot is falling down, fall control is activated in step 1106. In step 1108, it is determined how the robot is falling down. This may include determining the lean angle, lean velocity, CoM location, CoM velocity, and whether one or both legs are touching the ground, for example. The amount of time remaining to take action before the fall can also be determined. In step 1112, the next action to take is determined. This may be based on the outputs from step 1108 or from various other factors 1110. The factors 1110 include the existence, location, and movement of surrounding objects or people. One action 1114 to take is the change the direction of fall. This may involve changing the support base geometry of the robot of may involve performing inertia shaping. Another action 1116 is to cause a minimum impact fall of the robot. For example, the robot may fall on its back or may learn and adopt favorable postures.

Although the invention has been described in considerable detail with reference to certain embodiments thereof, other embodiments are possible as will be understood to those skilled in the art.

What is claimed is:

1. A method for controlling a robot having at least two legs, the robot falling down from an upright posture, the method performed by a computer system, and the method comprising:
    determining, by the computer system, a stepping location on a ground surface for the robot to step to in order to avoid hitting an object while falling, comprising:
        determining an allowable stepping zone where the robot is able to step while falling; and
        determining the stepping location within the allowable stepping zone, the stepping location maximizing an avoidance angle comprising an angle formed by a first line between the object to be avoided and a center of pressure of the robot upon stepping to the stepping location, and a second line between a reference point of the robot upon stepping to the stepping location and the center of pressure of the robot upon stepping to the stepping location, the reference point comprising a point on a ground surface where the robot can step in order to come to a stop given a state of the robot after stepping to the stepping location;
    controlling, by the computer system, the robot to take a step toward the stepping location.

2. The method of claim 1, wherein the reference point upon stepping to the stepping location comprises a capture point, and wherein a distance of the capture point from a center of mass (CoM) of the robot is proportional to a linear velocity of the CoM of the robot.

3. The method of claim 1, further comprising:
    determining a control duration, the control duration comprising an estimate of remaining time until the robot has fallen past a threshold angle.

4. The method of claim 3, wherein the allowable stepping zone is determined based on leg Jacobians of the robot and based on maximum joint velocities of the robot.

5. The method of claim 1, further comprising the following steps performed by the computer system:
    dividing the allowable stepping zone into cells, each cell being associated with a location within the allowable stepping zone and with a stepping foot orientation;
    for each cell, determining the reference point associated with the cell; and
    determining, based on reference points associated with each cell, which cell maximizes the avoidance angle, and wherein the determined stepping location comprises a location within the cell maximizing the avoidance angle.

6. The method of claim 1, further comprising the following steps performed by the computer system:
  determining a foot rotation angle based on a comparison between a trunk orientation angle of the robot and joint angles in a leg of the robot; and
  controlling leg joints of the robot to cause a swing foot of the robot to be substantially flat upon touching the ground surface, the controlling based on a transformation matrix from a support foot of the robot to the swing foot of the robot.

7. A system for controlling a robot having at least two legs, the robot falling down from an upright posture, the system comprising:
  a non-transitory computer-readable storage medium storing executable computer program modules configured for:
    determining a stepping location on a ground surface for the robot to step to in order to avoid hitting an object while falling, comprising:
      determining an allowable stepping zone where the robot is able to step while falling; and
      determining the stepping location within the allowable stepping zone, the stepping location maximizing an avoidance angle comprising an angle formed by a first line between the object to be avoided and a center of pressure of the robot upon stepping to the stepping location, and a second line between a reference point of the robot upon stepping to the stepping location and the center of pressure of the robot upon stepping to the stepping location, the reference point comprising a point on a ground surface where the robot can step in order to come to a stop given a state of the robot after stepping to the stepping location; and
    controlling the robot to take a step toward the stepping location.

8. The system of claim 7, wherein the reference point upon stepping to the stepping location comprises a capture point, and wherein a distance of the capture point from a center of mass (CoM) of the robot is proportional to a linear velocity of the CoM of the robot.

9. The system of claim 7, wherein the modules are further configured for:
  determining a control duration, the control duration comprising an estimate of remaining time until the robot has fallen past a threshold angle.

10. The system of claim 9, wherein the allowable stepping zone is determined based on leg Jacobians of the robot and based on maximum joint velocities of the robot.

11. The system of claim 7, wherein the modules are further configured for:
  dividing the allowable stepping zone into cells, each cell being associated with a location within the allowable stepping zone and with a stepping foot orientation;
  for each cell, determining the reference point associated with the cell; and
  determining, based on reference points associated with each cell, which cell maximizes the avoidance angle, and wherein the determined stepping location comprises a location within the cell maximizing the avoidance angle.

12. The system of claim 7, wherein the modules are further configured for:
  determining a foot rotation angle based on a comparison between a trunk orientation angle of the robot and joint angles in a leg of the robot; and
  controlling leg joints of the robot to cause a swing foot of the robot to be substantially flat upon touching the ground surface, the controlling based on a transformation matrix from a support foot of the robot to the swing foot of the robot.

13. A robot having at least two legs, the robot falling down from an upright posture, the robot including a robot controller comprising:
  one or more processors; and
  a non-transitory computer-readable storage medium storing computer-executable program instructions executable by the one or more processors, the instructions when executed causing the one or more processors to perform steps including:
    determining a stepping location on a ground surface for the robot to step to in order to avoid hitting an object while falling, comprising:
      determining an allowable stepping zone where the robot is able to step while falling; and
      determining the stepping location within the allowable stepping zone, the stepping location maximizing an avoidance angle comprising an angle formed by a first line between the object to be avoided and a center of pressure of the robot upon stepping to the stepping location, and a second line between a reference point of the robot upon stepping to the stepping location and the center of pressure of the robot upon stepping to the stepping location, the reference point comprising a point on a ground surface where the robot can step in order to come to a stop given a state of the robot after stepping to the stepping location; and
    controlling the robot to take a step toward the stepping location.

14. The robot of claim 13, wherein the reference point upon stepping to the stepping location comprises a capture point, and wherein a distance of the capture point from a center of mass (CoM) of the robot is proportional to a linear velocity of the CoM of the robot.

15. The robot of claim 13, wherein the non-transitory computer-readable storage medium further stores instructions for:
  determining a control duration, the control duration comprising an estimate of remaining time until the robot has fallen past a threshold angle.

16. The robot of claim 13, wherein the allowable stepping zone is determined based on leg Jacobians of the robot and based on maximum joint velocities of the robot.

17. The robot of claim 13, wherein the non-transitory computer-readable storage medium further stores instructions for:
  dividing the allowable stepping zone into cells, each cell being associated with a location within the allowable stepping zone and with a stepping foot orientation;
  for each cell, determining the reference point associated with the cell; and
  determining, based on reference points associated with each cell, which cell maximizes the avoidance angle, and wherein the determined stepping location comprises a location within the cell maximizing the avoidance angle.

18. The robot of claim 13, wherein the non-transitory computer-readable storage medium further stores instructions for:
  determining a foot rotation angle based on a comparison between a trunk orientation angle of the robot and joint angles in a leg of the robot; and
  controlling leg joints of the robot to cause a swing foot of the robot to be substantially flat upon touching the ground surface, the controlling based on a transformation matrix from a support foot of the robot to the swing foot of the robot.

* * * * *